United States Patent [19]

Yamano

[11] Patent Number: 4,781,308

[45] Date of Patent: Nov. 1, 1988

[54] PRODUCT FEEDING DEVICE

[75] Inventor: Shoji Yamano, Akashi, Japan

[73] Assignee: Yamato Scale Company, Limited, Japan

[21] Appl. No.: 906,434

[22] Filed: Sep. 12, 1986

[30] Foreign Application Priority Data

Jan. 29, 1986 [JP] Japan .................................. 61-19126

[51] Int. Cl.4 .......................................... G01G 13/00
[52] U.S. Cl. ......................................... 222/56; 222/77;
222/161; 222/308; 222/436; 222/438; 141/83;
177/18; 177/25; 177/58
[58] Field of Search ....................... 222/55, 56, 71, 77,
222/161, 307, 308, 436, 438, 547, 561, 58;
177/25.18, 58; 414/293, 299; 141/83

[56] References Cited

U.S. PATENT DOCUMENTS

| 2,100,315 | 11/1937 | Harper | 222/286 X |
|---|---|---|---|
| 3,091,368 | 5/1963 | Harley et al. | 222/56 |
| 4,168,019 | 9/1979 | Hausam | 222/308 |
| 4,361,254 | 11/1982 | Teraoku et al. | 222/410 X |
| 4,378,897 | 4/1983 | Kattlemann | 222/56 |
| 4,501,339 | 2/1985 | Fukuda | 141/83 X |
| 4,526,213 | 7/1985 | Martinez | 222/77 |
| 4,559,981 | 12/1985 | Hirano | 177/25.18 |
| 4,569,406 | 2/1986 | Pringle et al. | 177/25.18 |
| 4,658,992 | 4/1987 | Peleus | 222/547 X |

FOREIGN PATENT DOCUMENTS 59-52426 4/1984 Japan .

Primary Examiner—Joseph J. Rolla
Assistant Examiner—Gregory L. Huson
Attorney, Agent, or Firm—Senniger, Powers, Leavitt and Roedel

[57] ABSTRACT

A product feeding device suitable for use with a combination weighing machine having a plurality of weighing hopper. The device comprises a central vibrating dispersion table for dispersing product fed to the center of the table outwardly toward the periphery of the table, and a plurality of retaining hoppers corresponding to the weighing hoppers disposed at the periphery of the table for receiving product directly from the table. Each retaining hopper is equipped with a suitable mechanism for discharging products therefrom.

10 Claims, 2 Drawing Sheets

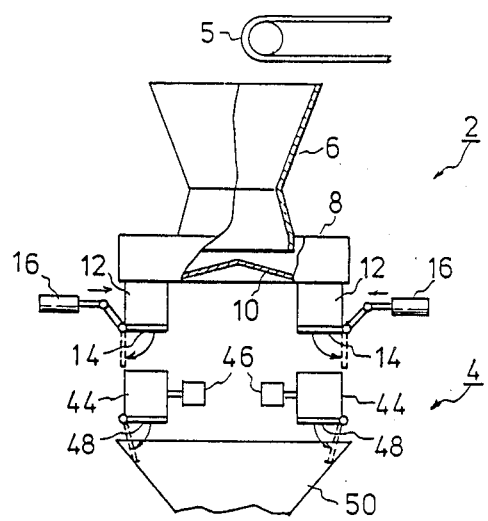
FIG. 1
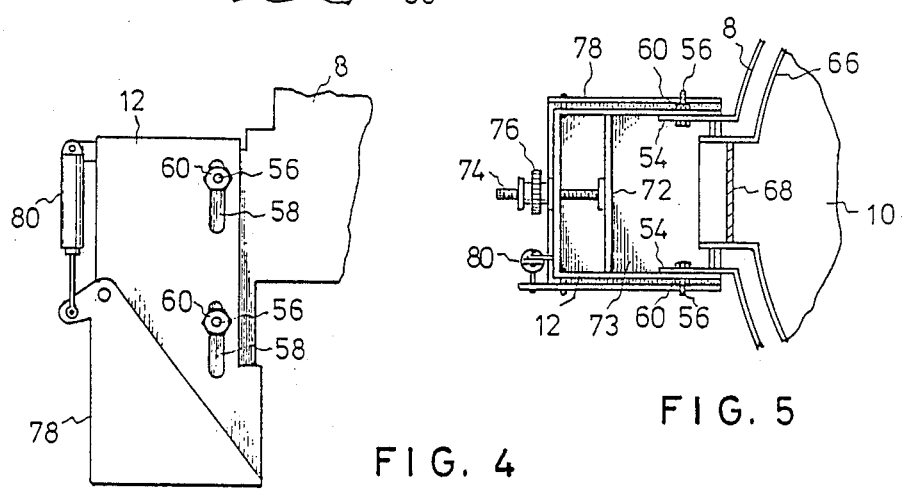
FIG. 4
FIG. 5
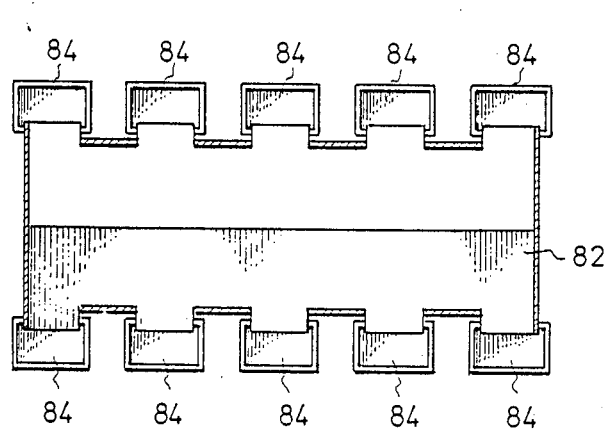
FIG. 6

PRODUCT FEEDING DEVICE

This invention relates to a product feeding device used for feeding product to a plurality of weighing hoppers of a combination weighing machine.

BACKGROUND OF INVENTION

A typical example of such type of product feeding device is disclosed in the Japanese utility model opening gazette No. 59-52426. The cited device includes a conical dispersion table which is rotationally driven with vertical vibration and a plurality of radial vibratory conveyer troughs and corresponding retaining hoppers disposed respectively above the weighing hoppers. In operation of this device, product to be weighed, which is fed down onto the apex of the dispersion table, slips down the conical surface towards the periphery and falls into each radial conveyer trough. Each trough is subjected to linear vibration to convey the product into the corresponding retaining hopper. Each retaining hopper is provided with means for detecting the amount of product fed thereto and providing a signal to stop the feed of product when a predetermined amount is reached.

In order to obtain high accuracy of combined weight in the combination weighing machine, it is preferable that the weights of product in respective weighing hoppers exhibit suitable variance. In order to achieve such variance, the amount of product received each weighing hopper from the corresponding retaining hopper is preferably controlled as described above.

While, in such prior art product feeding devices as cited above, the vibration of each radial conveyer trough is controlled for controlling the amount of feed, such troughs result in a large overall diameter of the feeding device and, therefore, in a large size of the combination weighing machine occupying a large space for installation. Such a large size of the machine results in elongated product collection paths which, in turn, results in an increased collection time and reduced efficiency of the machine.

Accordingly, an object of this invention is to provide an improved product feeding device having a significantly reduced diameter, thereby enabling a reduction in the size of the combination weighing machine and an increase in the machine's efficiency or the rate of delivery.

This object can be attained in accordance with the present invention by removing the radial conveyer troughs from the prior art product feeding device and, instead, providing each retaining hopper with a novel device for controlling the amount of product ultimately fed to the corresponding weighing hopper.

SUMMARY OF INVENTION

According to one aspect of this invention, there is provided a product feeding device including a dispersion device for dispersing product fed substantially to its central portion towards its peripheral portion, and a plurality of retaining hoppers disposed at the periphery of the dispersion device. Each retaining hopper is provided with means for discharging the retained product.

According to another aspect of this invention, each retaining hopper is provided also with means for limiting the amount of feed to a selected volume and means for continuing the discharge even after completion of discharge of the selected volume of product, thereby adding suitable variance to the weights from the weighing hoppers.

These and other features of this invention will be described in detail below in conjunction with some embodiments with reference to the accompanying drawings.

In the drawings:

FIG. 1 is a schematic side view of a product feeding device in combination with a combination weighing machine, in which this invention is embodied;

FIG. 4 is a partial side view of the embodiment of FIG. 3;

FIG. 5 is a sectional plan view of the embodiment of FIG. 3 taken along line VI—VI thereof; and FIG. 6 is a schematic sectional plan view representing a further embodiment of this invention.

DESCRIPTION OF PREFERRED EMBODIMENTS

Figure 2:
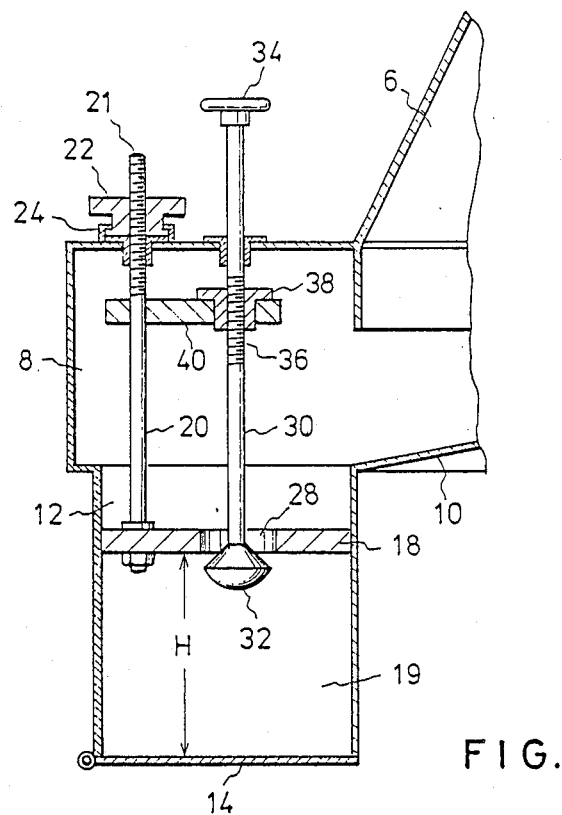
FIG. 2 is a sectional side view representing a part of the product feeding device as shown in FIG. 1.

Referring to FIG. 1, the product feeding device 2 of this invention is disposed above a combination weighing machine 4 for distributively transferring product fed continuously thereto by a belt conveyer 5. The device 2 includes a funnel-like feeding chute 6 for receiving the product from the conveyer 5 and a substantially conical dispersion table 10 disposed under the chute 6 and enclosed in a cylindrical hood 8. A plurality of retaining hoppers 12 (only two are shown for simplicity) are arranged circularly around the dispersion table 10 for receiving product delivered radially therefrom. Each retaining hopper 12 has a relatively large bottom opening or outlet which is normally closed by a flap door 14 selectively driven by an air cylinder 16.

As shown in FIG. 2, each retaining hopper 12 is formed as a square box and attached by suitable means to the bottom of the hood 8 along the periphery of the dispersion table 10. A horizontal partition plate or wall 18 is loosely fitted in the hopper 12 to define a product-holding chamber 19 therebelow having a height H. The partition plate 18 is supported by a vertical rod 20 having a male (externally threaded) screw 21 at its upper end. The screw 21 meshes with a nut member 22 which is free to rotate but vertically confined by a member 24. Therefore, manual rotation of the nut 22 will result in vertical movement of the partition plate 18 for controlling the height H and, therefore, the volume of the chamber 19.

The partition plate 18 has a circular hole 28 therein for passage of product into chamber 19 and a valve member 32 fixed to the lower end of another vertical rod 30 is provided for controlling the aperture of the hole 28. The vertical rod 30 extends up out of the hood 8 and a handle 34 is fixed to its upper end. The rod 30 has a male screw 36 in its middle portion, which meshes with another nut member 38 which is fixed to a bracket 40 which is in turn fixed to the former vertical rod 20. Accordingly, the valve member 32 moves vertically with the partition plate 18 keeping a fixed positional relationship therebetween and, at the same time, can be moved vertically with respect to the partition plate 18 by manually rotating the handle 34.

Returning to FIG. 1, the combination weighing machine 4 includes a plurality of weighing hoppers 44 disposed directly under respective retaining hoppers 12 and provided with weight sensors 46, such as load cells, respectively, for receiving product from the retaining hoppers 12 and weighing the same by the weight sensors 46 to produce corresponding weight signals. As is well known in this field, a combination arithmetic section (not shown) combines these weight signals appropriately to select a combination giving a total weight satisfying a predetermined condition. Each weighing hopper 44 has a bottom opening which is normally closed by a flap door 48. The combination arithmetic section drives the doors 48 of those weighing hoppers 44 corresponding to the selected combination in the known manner. Thus, a batch of product satisfying the weight condition is collected by a funnel-like collection chute 50.

Before operation, the height H or volume of the retaining chamber 19 of each retaining hopper 12 is adjusted by rotating the adjusting nut 22 and, then, the aperture of the passage 28 is adjusted by rotating the handle 34. In operation, the dispersion table 10 is vibrated together with the retaining hoppers 12 by a suitable vibrating device (not shown) and the product fed from the belt conveyer 5 into the chute 6 is distributed radially by the vibratory dispersion table 10 into respective retaining hoppers 12. In each retaining hopper 12, as shown in FIG. 2, the product is fed from the table 10 through the aperture 28 into the product-holding chamber 19. When the chamber 19 is filled with the product no further product can enter the chamber 19 and excess product will be accumulated on the partition plate 18.

When the bottom door 14 of the hopper 12 is opened in this state upon completion of the combination selection, the mass of product within the chamber 19 having a preset volume is discharged at once (substantially instantaneously) into the underlying weighing hopper 44. However, this fixed volume (and, fixed weight if the density of product is uniform) discharge is followed by a small continuous discharge of excess product through the relatively small (compared to the outlet of the retaining hopper) preset aperture 28 until the door 14 is closed. The amount of this excess discharge can be controlled by controlling the aperture 28 and/or the timing of closure of the door 14. In this embodiment, therefore, the variance in the weights of product in the weighing hoppers 44 can be selected suitably by adjusting one or more of the abovementioned presettable factors, namely, height H, aperture 28 and door 14 closing time in hopper-by-hopper fashion.

In the above embodiment, the partition plate 18 and the valve member 32 may be driven by means other than screws, such as air-cylinders. In this case, the valve 32 may be closed every time the chamber 19 has been filled, so that no excess product is added to the discharged product of fixed volume.

Figure 3:
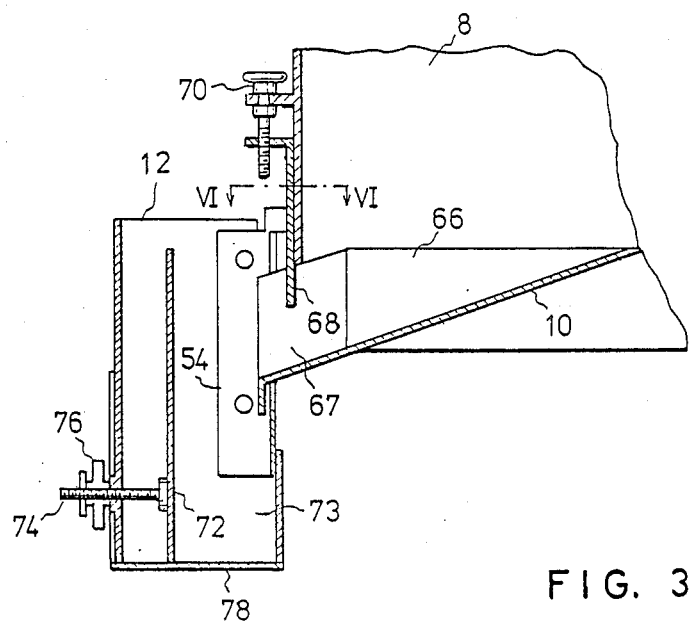
FIG. 3 is a sectional side view representing a part of the product feeding device including another embodiment of this invention.

Referring next to FIGS. 3, 4 and 5 showing a second embodiment of the dispersion feeder 2, a part of cylindrical hood 8 is cut out to form a pair of support plates 54 and each retaining hopper 12 is attached thereto by means of bolts 56 and nuts 60. The dispersion table 10 in this embodiment has a peripheral wall 66 a part of which is also cut out and a corresponding part of the conical surface of the dispersion table 10 extends radially therefrom into the retaining hopper 12 to form an inlet 67 (outlet of dispersion table 10). A vertically movable gate plate 68 is disposed in each inlet 67 so that its vertical position, that is, the aperture of the inlet 67, can be adjusted by means of an adjusting screw 70.

In the retaining hopper 12, a vertical partition plate or wall 72 is disposed to define a product-holding chamber 73. While product fed from the dispersion table 10 into the chamber 73 is accumulated therein, no further accumulation will occur after the level of product reaches the bottom edge of the gate plate 68. As in the first embodiment of FIG. 2, this retaining hopper 12 is also provided with a bottom door 78 selectively driven by an air-cylinder 80. Therefore, when the door 78 is opened, a specific amount of product is discharged substantially instantaneously through the relatively large outlet of the hopper and a small amount of discharge through relatively small inlet 67 will follow as in the case of a first embodiment. The partition plate 72 can be moved by means of screw rod 74 and adjusting nut 76 to control the volume of product-holding chamber 73. The volume of chamber 73 can also be changed by vertically shifting the hopper 12 along vertical slots 58 (FIG. 4) by loosening the nuts 60. In this embodiment, therefore, the variance of weights can be controlled suitably by adjusting at least one of such factors as the horizontal position of partition plate 72, vertical position of hopper 12 and aperture of inlet 67.

While, in the abovementioned embodiments, the retaining hoppers (and corresponding weighing hoppers) are arranged circularly, it is known in this field that they may also be arranged linearly as shown in FIG. 6. In the drawing, 82 denotes a linear (rather than circular) dispersion table which is flat and slanting to the slopes in opposite directions and 84 denotes retaining hoppers attached to the lower edges of the table 82. The hoppers may be arranged in a single line if occasion demands.

It is essential to this invention that the size of the narrow passage 28 or 67 between the dispersion table 10 and the product-holding chamber 19 or 73 is much less than the size of the discharge opening (outlet) 14 or 78 of the retaining hopper. According to this feature, product passes through the passage 28 or 67 and fills the product-holding chamber of the retaining hopper at relatively slow speed. When the discharge opening is opened, the contents of the retaining hopper are discharged substantially instantaneously into the weighing hopper. Although some amount of product passing through the narrow passage follows this discharge, this additional amount is small and substantially fixed since the opening time is very short. Accordingly, the amount of product fed to each weighing hopper is fixedly controlled.

As shown in the drawings, the path of product between the dispersion feeder and each product-holding chamber is completely shielded from the outside. Therefore, there should be no scattering or catching of product along this path. Moreover, the inventive device needs neither a linear conveyor nor a driving device for such a conveyor, which have been used in the prior art devices, and this results in a more compact device which can reduce both the cost and size of the combination weighing machine.

What is claimed is:

1. A product feeding device for a combination weighing machine, comprising a dispersion table for dispersing product fed to its central portion toward its peripheral portion, and a plurality of retaining hoppers disposed immediately adjacent said peripheral portion of the dispersion table for directly receiving product as it falls off the dispersion table, each retaining hopper being adapted for holding a specific volume of product and each having means for discharging said product into a weighing hopper therebelow, and each retaining hopper including means for automatically discharging a predetermined additional amount of product after said specific volume of product has been discharged from said hopper.

2. A device, as set forth in claim 1, wherein said additional discharging means includes a path from said dispersion device to said retaining hopper having a variable-size aperture therein.

3. A product feeding device for feeding a predetermined amount of product to each of a plurality of weighing hoppers of a combination weighing machine, said product feeding device comprising a plurality of retaining hoppers each disposed above a respective weighing hopper, and a dispersion feeder for supplying product to said retaining hoppers, said product feeding device being characterized in further comprising means attaching each retaining hopper to the periphery of the dispersion feeder, means defining a product-holding chamber of substantially fixed volume in each retaining hopper, said retaining hopper having a relatively large outlet adapted to open to permit the substantially instantaneous discharge of the contents of said product-holding chamber into a respective weighing hopper, and a passage between the dispersion feeder and the product-holding chamber of each retaining hopper through which product is adapted to pass into the chamber to fill it, said passage being substantially smaller in size than the outlet of the retaining hopper whereby product is adapted to pass through said passage at a rate less than the rate of discharge of product through the outlet when the outlet is open, said passage being adapted to remain open during discharge of product from the product-holding chamber through said outlet whereby a relatively small quantity or product in addition to the contents of said product-holding chamber is adapted to be discharged into a respective weighing hopper, said relatively small quantity of product and the contents of said product-holding chamber combining to equal said predetermined amount of product.

4. A product feeding device as set forth in claim 3 wherein the size of said passsge is adjustable to vary the rate of product flow therethrough.

5. A product feeding device as set forth in claim 3 wherein the volume of said product-holding chamber is adjustable.

6. A product feeding device as set forth in claim 3 wherein said dispersion feeder is adapted to vibrate and the retaining hoppers are attached to the dispersion feeder for conjoint vibration therewith.

7. A product feeding device as set forth in claim 3 wherein the position of said passage determines the volume of said product-holding chamber.

8. A product feeding device as set forth in claim 7 wherein the size of said passage is adjustable to vary the rate of product flow therethrough.

9. A product feeding device as set forth in claim 8 wherein the volume of said product-holding chamber is adjustable.

10. A product feeding device as set forth in claim 9 wherein said dispersion feeder is adapted to vibrate and the retaining hoppers are attached to the dispersion feeder for conjoint vibration therewith.

* * * * *